United States Patent
Kindt-Larsen et al.

Patent Number: 5,849,209
Date of Patent: *Dec. 15, 1998

[54] MOLD MATERIAL MADE WITH ADDITIVES

[75] Inventors: Ture Kindt-Larsen, Holte, Denmark; Jeffrey Longo, Jacksonville, Fla.; Keith O'Brien, Jacksonville, Fla.; James Jen, E. Jacksonville, Fla.; Michael Widman, Jacksonville, Fla.; Mehmet Burduroglu, Yenikoy Istanbul, Turkey; Robert LaBelle, Jacksonville, Fla.

[73] Assignee: Johnson & Johnson Vision Products, Inc., Jacksonville, Fla.

[*] Notice: The term of this patent shall not extend beyond the expiration date of Pat. No. 5,690,865.

[21] Appl. No.: 536,760

[22] Filed: Sep. 29, 1995

Related U.S. Application Data

[63] Continuation-in-part of Ser. No. 414,999, Mar. 31, 1995, Pat. No. 5,690,865.

[51] Int. Cl.[6] ............................... B28B 7/00; B29C 33/40
[52] U.S. Cl. ........................... 249/134; 425/175; 425/808
[58] Field of Search .................................. 264/1–38, 300, 264/334, 337, 130, 2.3; 425/808, 174.4, 175; 249/117, 134

[56] References Cited

U.S. PATENT DOCUMENTS

| | | |
|---|---|---|
| 3,422,168 | 1/1969 | Bowser . |
| 3,424,607 | 1/1969 | Coscia ...................................... 264/338 |
| 4,159,292 | 6/1979 | Neefe ....................................... 264/338 |
| 4,311,654 | 1/1982 | Blandin .................................... 264/2.3 |
| 4,534,916 | 8/1985 | Wichterle ................................. 264/2.3 |
| 5,417,557 | 5/1995 | Ross et al. ............................... 264/334 |

FOREIGN PATENT DOCUMENTS

| | | |
|---|---|---|
| 0 560 011 A | 9/1993 | European Pat. Off. . |
| 0 735 092 A2 | 3/1996 | European Pat. Off. . |
| 62-032010 | 2/1987 | Japan . |
| 1-315444 | 12/1989 | Japan . |
| 6-155489 | 6/1994 | Japan . |
| 92 09421 A | 7/1992 | WIPO . |

*Primary Examiner*—Mathieu D. Vargot

[57] ABSTRACT

The present invention is directed to a composition of polystyrene or polypropylene with at least 0.5% (w/w) of an additive or wetting agent, the article of manufacture comprised thereof, such as a mold for making contact lenses and the mold assembly containing said mold, and the use of such mold so to minimize defects, such as holes, puddles, chips and tears in the lens.

22 Claims, 8 Drawing Sheets

FIG. 3 (b)
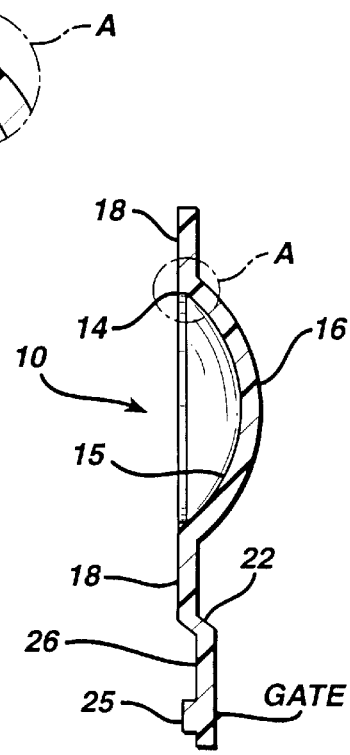
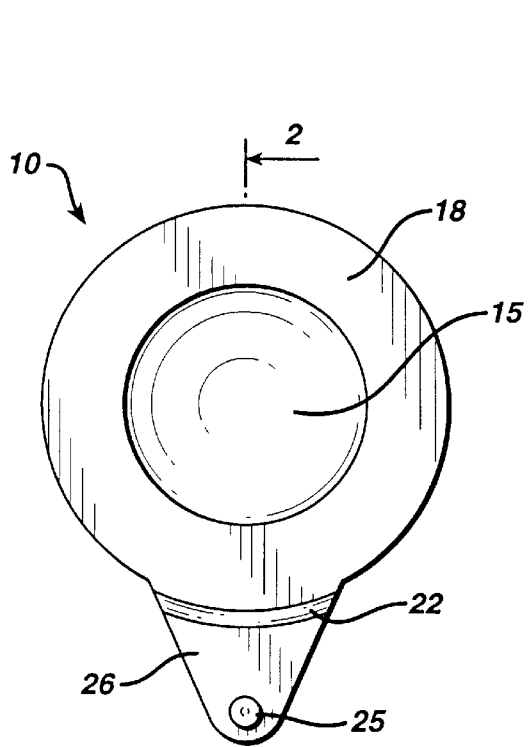
FIG. 3
FIG. 3 (a)
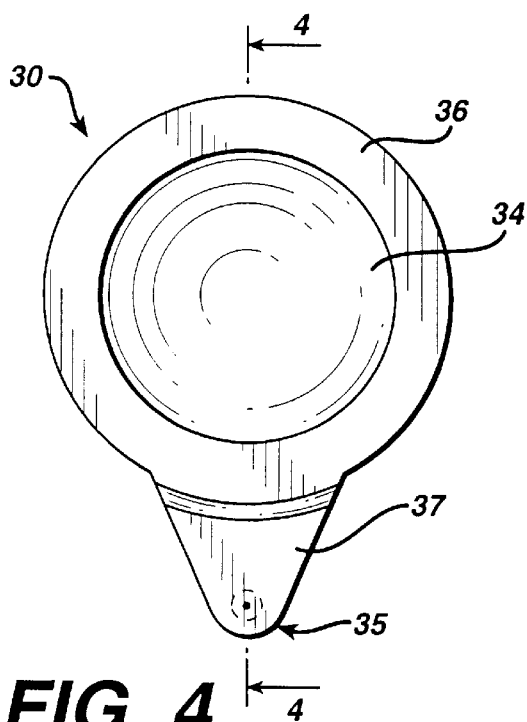
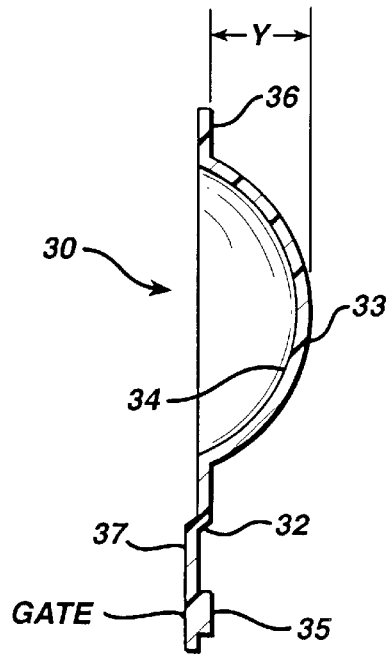
FIG. 4
FIG. 4 (a)

BASE CURVE FRAME

WETTING FORCE

MOLD MATERIAL MADE WITH ADDITIVES

RELATED APPLICATIONS

This is a continuation-in-part of application U.S. Ser. No. 08/414,999, filed Mar. 31, 1995 now U.S. Pat. No. 5,690,825.

BACKGROUND OF THE INVENTION

1. Field of the Invention

The present invention relates to a novel polymeric formulation containing an internal mold release additive which assists in the release of one mold component from another or an internal mold wetting agent which enhances the interfacial wetting between the reactive monomer mix and the mold surfaces, thereby reducing the amount of defects formed in the contact lens. The present invention is also directed to the molds made from such polymeric formulation as well as to a method of preparing contact lenses from these molds.

2. Background Information

An extensive array of methods is currently utilized in the manufacture of hydrophilic polymer articles, such as soft contact lenses. A considerable variety of techniques have been employed, such as spin casting, static cast molding, lathing, and a combination of casting and lathing, and particularly through the use of two part molds. Generally, such mold parts for hydrophilic contact lenses consist of a curvilinear (concave/convex) center of front curve mold part adapted to form, in cooperation with a mating base mold curve part, a two part mold for the contact lenses. These hydrophilic contact lenses are usually constituted from a hydrophilic polymer, preferably a HEMA-based polymer (hydroxy-ethylmethacrylate), among numerous other materials.

The components of the mold within which the hydrophilic polymer contact lenses are molded may consist of suitable pallets, each including a plurality of cavities receiving mold parts having female and/or male base surfaces or curvilinear mold portions for the formation of the curved contact lenses. The molds, as described, for instance in the molding technology, may be constituted from suitably selected conventional plastic materials, whereby the hydrophilic polymer articles, i.e., the contact lenses, will be formed in the cavity therebetween, and may possibly adhere to one or both of the mold parts. In the utilization of separable two part molds for the molding of hydrophilic contact lenses, upon completing the molding step, it is of critical importance to be able to release the hydrophilic contact lenses from their surface engagement without adherence to the mold parts or at least one of the mold halves and to separate the mold part without causing damage to the contact lenses which would render the lenses unusable.

Unfortunately, all too frequently, damage is sustained during the preparation of contact lenses. The potential damages which generally renders the contact lenses unable to meet necessary quality and/or inspection standards may consist of edge tears and chips, nicks or other surface defects formed in the contact lenses. Other causes of rejected lenses are holes, voids in center of the cast that are developed in the lenses during the molding process, pits, i.e. areas on non-uniform thickness, and puddles.

As a result there is a need to find a new formulation for the mold that would reduce the risk of damage and defects.

Lens defects are major factors that causes low production yield. There are two different types of problems associated with contact lenses production which the present invention is solving.

One such problem is the appearance of chips and tears in the lens. These are caused during the demolding step and are caused by adhesion of the mold to the lenses. The present invention overcomes this problem by utilizing an alternative material for one of the mold parts. This new material contains an additive that is added to the mold which greatly reduces the adhesion forces between the lenses and the mold part, thereby facilitating the release of the mold material and minimizing the risk of developing defects in the lens caused by and during the demolding step.

The second problem which is addressed by the present invention is the prevention of the formation of holes and puddles, which are developed in the lenses during the molding process. Holes are usually found as voids in the center of the lens, while puddles are usually in random or in tree branch shapes, and are usually found along the lens edge and are usually associated with the concave or front curve mold. According to the inventors, they are caused mainly by poor wetting of the mold surface by the reactive monomer mix at assembly of the mold surface. More specifically, the poor wetting usually is due to either incompatible chemistry or incompatible charges across the interface of the mold and the reactive monomer mix or the combination of both. More importantly, a heterogeneous mold surface which causes uneven wetting by the reaction monomer mix, results in many local unwetted voids, and therefore lead to holes or puddles in the contact lens.

According to the inventors these holes and puddles would be overcome if a prior wetting agent is added to the polymer mold so as to increase the wettability power of the mold. In order to understand the concept of wetting, a brief digression will be made to discuss the events occurring on the molecular level in a liquid. In the body of a liquid, the time-averaged force exerted on any given molecule by its neighboring molecule is zero. Even though such a molecule may undergo diffusive displacements due to random collisions within the liquid, for any long duration, there exists no directed forces upon it. There is equal probability to be displaced in one direction as another. However, the situation is quite different at the surface of the liquid since there exist no molecules to counteract the forces exerted by the molecules in the interior for molecules on the surface. As a result, molecules on the surface of a liquid experience a net attraction toward the interior of a drop, thereby causing the droplet to assume a spherical shape, minimizing both free energy and surface area. This creates a surface tension, which from a microscopic point of view is the reversible isothermal work which must be done in bringing molecules from the interior of the liquid to the surface, and creating 1 unit of new surface thereby. The present inventors believe that overcoming the surface tension would remove the potential for forming "holes" in the liquid, i.e., would make the liquid spreadable or wettable on a solid.

In the wetting or nonwetting of solids by liquids, the criteria employed is the contact angle between the solid and the liquid (measured through the liquid). Reference is made to FIG. 6 which illustrates the relationship between contact angle "a" and the interfacial tensions that exist at the surface of a liquid. As clearly shown, there are three interfaces which exist when a droplet of liquid contacts a solid, and thus there are three corresponding interfacial tensions, $\gamma SL$, $\gamma SV$ and $\gamma LV$, wherein $\gamma$ refers to the interfacial tension, S, L and V refers to solid, liquid and vapor, respectively. A liquid is said to wet a solid if the contact angle "a" lies between 0° and 90°, and not to wet the solid if the contact angle lies between 90° and 180°. At equilibrium, a balance of interfacial tensions exist at the line of common contact, which intersects FIG. 6 at point 0. For a liquid wetting the solid, this equilibrium is expressed by the relation:

$$\gamma SV = \gamma SL + \gamma LV \cos \Theta$$

The present inventors have modified this concept and utilized this modification to determine if a particular substance could be used to reduce the tendency of forming holes and puddles in making contact lenses. Moreover, the present inventors have found a trend and thus have found that particular compounds when admixed with the polymeric mold material significantly reduces the amount of holes and puddles in contact lenses.

Their solution was based upon their understanding of the thermodynamics of the situation. They calculated that, the theoretical estimation of wetting, which is the thermodynamic parameter called the spreading coefficient, is defined as:

$$S = \gamma_s - \gamma l - \gamma_s l$$

where S is the spreading coefficient, $\gamma_s$ is the surface energy of the mold material, $\gamma l$ is the surface tension of the reactive monomer mix ("RMM") and the $\gamma_s l$ is the interfacial tension between reaction monomer mix and the mold material. A positive "S" indicates spreading (or wetting). Therefore, in order to spread or to wet, $\gamma l$ and $\gamma_s l$ should be made as small as possible or $\gamma_s$ should be made as large as possible. Practically, this means that the surface energy of the mold is increased or the surface tension of the reactive monomer mix is reduced or both is effected in order to obtain the appropriate wetting between reactive monomer mix and the mold. With respect to increasing the mold surface energy, this requires consideration of increasing not only the total surface energy, but also increasing the portion of high energy surface.

This can be accomplished by various techniques for example, by coating the surface of one of the mold halves with surfactant, as described in copending application, assigned to the same assignee as the present application and entitled METHOD FOR REDUCING LENS HOLE DEFECTS IN PRODUCTION OF CONTACT LENS BLANKS application Ser. No. 08/586,944, pending, the contents of which are incorporated by reference, or by transiently coating a the mold surface with a wetting agent, as described in copending application, assigned to the same assignee as the present application and entitled METHOD FOR TRANSIENTLY WETTING LENS MOLDS IN PRODUCTION OF CONTACT LENS BLANKS TO REDUCE LENS HOLD DEFECTS, application Ser. No. 08/536,929, now U.S. Pat. No. 5,674,557, the contents of which are incorporated by reference. Another method, which is an embodiment of the present invention is the incorporation of wetting agents into the mold material.

Obviously, not all wetting agents to the mold material will be effective. The present inventors have developed a methodology for determining which admixtures will be useful for the composition of the mold material for the manufacture of contact lenses having a reduced number of holes or puddles. In consequence thereof, the present inventors have developed a new mold material which have the added advantage of reducing the tendency to form holes or puddles.

Therefore, the present inventors have developed new mold formulations improving the yield in and reducing the defects in contact lenses. In one embodiment, the formulation of the present invention reduces the tendencies to form chips and tears. In another embodiment, the present formulation reduces the tendencies to form holes and puddles in contact lenses.

SUMMARY OF THE INVENTION

Accordingly, the present invention provides for a mold for making contact lenses comprising thermoplastic polymer of either polystyrene or polypropylene admixed with an internal mold release agent (additive) or wetting agent.

In one aspect of the present invention, the mold comprises a molding resinous thermoplastic polymer admixed with a mold release agent such as waxes, soaps and oils in mold releasing effective amounts. Said thermoplastic polymer consists of polystyrene or polypropylene. The additive is preferably a propylene wax having a molecular weight ranging from 5,000–200,000, a polyethylene wax having a molecular weight of 5,000–200,000, a fatty acid having 5–26 carbon atoms, a hydrocarbyl carboxylic acid amide having a molecular weight of 200–2,000, silicones having a molecular weight of 2,000 to 100,000, Montan wax, complex esters, oxidized wax or combinations thereof.

In another aspect, the mold comprises a thermoplastic polymer admixed with a wetting effective amount of a wetting agent, said thermoplastic polymer consisting of polypropylene or polystyrene, said mold exhibiting a wetting force when partially immersed in water defined by the equation $$F = 2\gamma_1 p \cos \Theta$$

wherein

F is the wetting force of the mold;

$\gamma$, is the surface tension of water;

p is the perimeter of the mold at the meniscus of the water when the mold is partially immersed in the water;

$\Theta$ is the dynamic contact angle between the water and the mold, whereby said contact angle is less than or equal to 100°.

When these materials were used to make one of the mold halves in the mold assembly for making the contact lenses, it was found that fewer lenses were formed having the defects described hereinabove. Thus, an aspect of the present invention is directed to the mold half comprised of this new formulation. This mold half is part of the mold assembly, and therefore another aspect of the present invention is directed to the mold assembly comprising said mold half comprised of these formulations of the present invention.

The mold assembly preferentially comprises at least two pieces, a female concave piece (front piece) and a male convex piece (back piece) forming a cavity therebetween, and when said pieces are mated, at least one piece having a flange thereabout. More particularly, in a preferred embodiment, the mold assembly comprises a front mold half and a back mold half in contact therewith, thereby defining and enclosing a cavity therebetween, and a polymerizable composition in said cavity in contact with said mold halves, the front mold of which has a central curved section with a concave surface, a convex surface and a circular circumferential edge, wherein the portion of said concave surface in contact with said polymerizable composition has the curvature of the front curve of a contact lens to be produced in said mold assembly and is sufficiently smooth that the surface of a contact lens formed by polymerization of said polymerizable composition in contact with said surface is optically acceptable, said front mold also having an annular flange integral with and surrounding said circular circumferential edge and extending therefrom in a plane normal to the axis and extending from said flange, while the back mold has a central curved section with a concave surface, convex surface and circular circumferential edge, wherein the portion of said convex surface in contact with said polymerizable composition has the curvature of the back curve of a contact lens to be produced in said mold assembly and is sufficiently smooth that the surface of a contact lens formed by polymerization of the polymerizable composition in contact with said surface is optically acceptable, said back curve also having an annular flange integral with and surrounding said circular circumferential edge and extending therefrom in a plane normal to the axis of said convex structure, and a generally triangular tab situated in a plane normal to said axis and extending from said flange, wherein the convex structure of said back mold half contacts the circumferential edge of the front mold half.

The inner concave surface of the front mold half defines the outer surface of the contact lens, while the outer convex surface of the base mold half defines the inner surface of the contact lens which rests upon the edge.

In this assembly, either the back mold or the front mold half or both is comprised of the novel formulation of the present invention. However, it is the back mold half that is preferably comprised of the novel formulation of the present invention, while the front curve mold is comprised of a thermoplastic material that does not contain the additive or wetting agent. Thus another aspect of the present invention is directed to the base mold comprised of said novel formulation.

The mold assembly with the base curve mold made up of the polystyrene/additive or polypropylene/additive, polystyrene/wetting agent or polypropylene/wetting agent formulations is used in making soft contact lenses. Thus, another aspect of the present invention is directed to the process of making soft contact lenses utilizing this mold assembly. As described herein, the use of the formulations of the present invention modifies the surface chemistry of the back mold by enhancing its wettability. In addition, a formulation of the present invention facilitates the release of the mold from the polymerized polymer comprising the contact lens and the front mold.

Another aspect of the present invention is directed to a process of minimizing and/or preventing chips or tears in the contact lens by utilizing a mold comprised of polystyrene or polypropylene admixed with the additive described hereinabove in mold releasing effective amounts. Another aspect of the present invention is directed to a process of minimizing and/or preventing holes or puddles in the contact lens by utilizing a mold half comprised of a thermoplastic material admixed with an effective amount of a wetting agent, said thermoplastic material being polystyrene or polypropylene, and said mold half being sufficiently wet to have a dynamic contact angle when immersed in water of 100° or less.

BRIEF DESCRIPTION OF THE DRAWINGS

The present invention may be more readily understood by one skilled in the art with reference being had to the following detailed description of several preferred embodiments thereof, taken in conjunction with the accompanying drawings wherein like elements are designated by identical reference numerals throughout the several views.

FIGS. 3 and 3($a$) are respectively, a top or planar view and an elevation of side view of one embodiment of a first (female) or front curve mold half molded pursuant to the present invention.

FIG. 3($b$) is an enlarged detail of a portion of FIG. 3($a$).

FIGS. 4 and 4($a$) are respectively a top or planar view and an elevation or side view of one embodiment of a second (male) or back curve mold half molded pursuant to the present invention.

DETAILED DESCRIPTION OF THE PRESENT INVENTION

Figure 1:
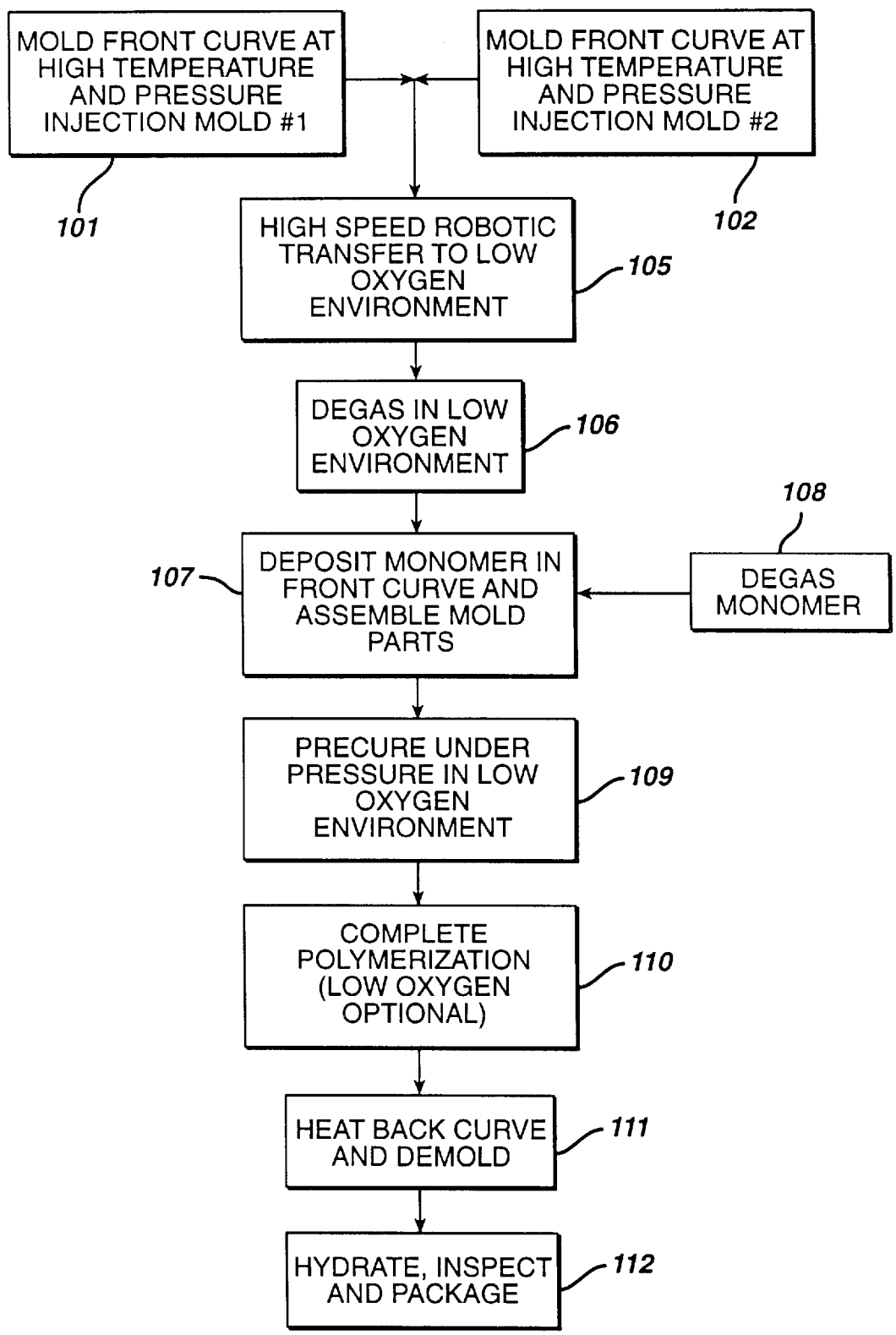
FIG. 1 is a flow diagram of the continuous process for contact lens production, including molding, treatment and handling of the molds and contact lenses in a low oxygen environment.

As described hereinabove, the mold contains an internal additive or wetting agent. In other words, the additive or wetting agent is thoroughly admixed with the thermoplastic polymer. This provides a substantially uniform distribution of these internal additives or wetting agents across the surface of the mold resin and decreases the probability that they would be retained on the lens. The polystyrene/additive, polypropylene/additive, polystyrene/wetting agent or the polypropylene/wetting agent compositions are prepared by processes well known to those skilled in the art. The following procedure exemplifies the techniques used to make the formulations of the present invention, using polystyrene and an additive as an example. However, it is exemplary and is equally applicable for the preparations of the other formulations of the present invention.

The polystyrene and the additive are mixed together by techniques known to one skilled in the art. In one methodology, the polystyrene is compounded with the additive. In other words, a predetermined amount of the additive and polystyrene are mixed together, the mixture is heated to melt the polystyrene, the melted polystyrene and the additive are then again mixed together, such as with an extruder, which further intermixes the two components. The mixture can then be repelletized in a pellatizer. Alternatively, the polystyrene may first be melted to form the molten polystyrene and the additive added to the molten polystyrene in the mixer, e.g., extruder, and mixed together and then repelletized with the pelletizer. Alternatively, the additive can be compounded with the thermoplastic material directly in the molding machine.

The amount of additive added to the thermoplastic material is a mold releasing effective amount, while the amount of wetting agent added is a wetting effective amount. The mold material comprised thereof is to be transparent to UV transmission, especially of from 3 to 5 nm up to wavelengths of 300 nanometers. However these amounts preferentially overlap. More specifically, when present, the additive or wetting agent is preferably present in an amount ranging from about 0.05% to about 5% (w/w) relative to the thermoplastic material, and more preferably ranging from about 0.1% to about 2.5% (w/w).

These mold formulations solve two different problems; thus, the mold formulation used is dependent upon the objective. If the objective is to reduce holes, the mold formulation utilized is the thermoplastic material admixed with wetting agent. If the objective is to reduce puddles, the front curve mold is formed of the thermoplastic material with wetting agent. On the other hand, if the objective is to facilitate mold release from the lens, then the mold formulation utilized for at least one of the molds, preferably the back mold, is the thermoplastic material with additive.

As used herein, reference to the "wetting formulation" or "composition" refers to the mold material comprised of the thermoplastic material (e.g. polypropylene and more preferably polystyrene) and the wetting agent, as defined herein. Alternatively reference to the "mold release formulation" or "composition" refers to the mold material comprised at the thermoplastic material (e.g. polypropylene or polystyrene) and the mold release agent. Reference to the "formulations" or "compositions" of the present invention or equivalent expression which does not specify 'mold release' or 'wetting' refers to both formulations.

The mold formulations of the present invention may comprise either the backcurve mold, the front curve mold or both. Because of their surface curative differences, the wetting or adhesion force at the RMM/backcurve interface is different from that of the RMM/front curve interface. It is preferred that the backcurve be comprised of the mold material of the present invention.

In the discussions that follow, reference will be made to the backcurve, however, unless indicated to the contrary, these discussions are equally applicable to the front curve, and the use of the backcurve is for illustrative purposes.

To determine the feasibility of a mold material for use in the backcurve mold to reduce the tendency to form holes in the contact lenses, the inventors developed a modified wetting method to measure the wettability of the backcurve mold. This method measures the wetting forces between the probe wetting liquid (D.I. water) and the backcurve mold surface defined by the relationship.

$$F = 2\gamma_1 \, p \cos \Theta$$

wherein

F is the wetting force(mg) of the mold half being measured;

$\gamma_1$ is the surface tension of the probe liquid, i.e., the water;

p is the perimeter of the mold half at the meniscus (cm) when the mold half is partially immersed in the water; and $\Theta$ is the dynamic contact angle in degrees.

Figure 7:
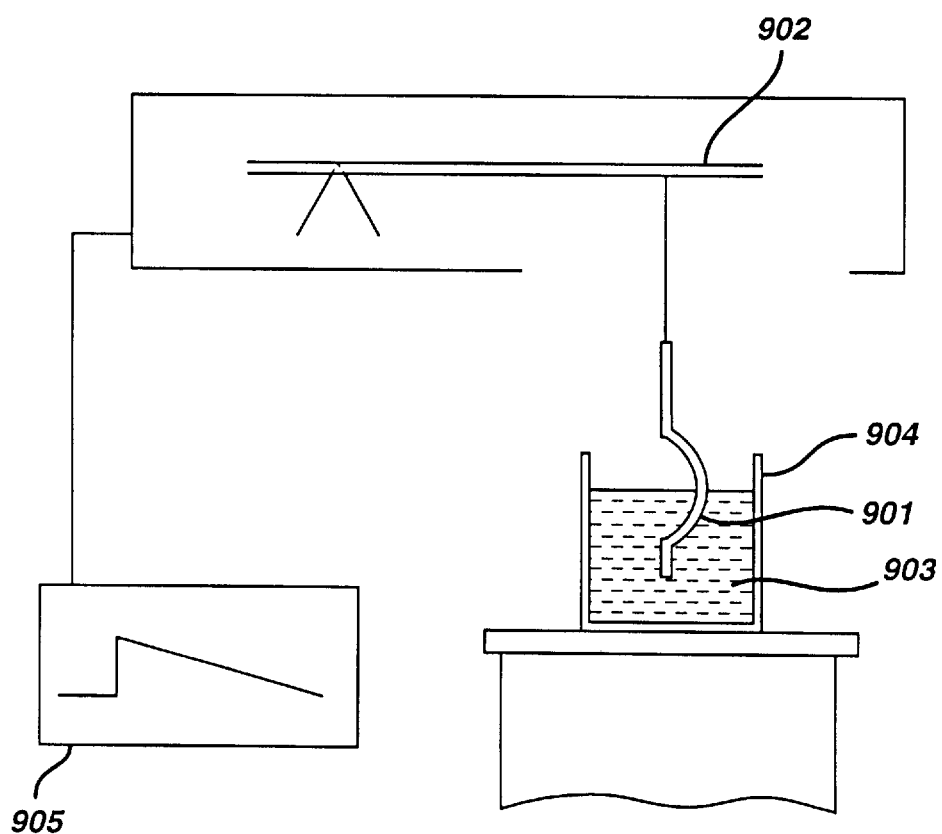
FIG. 7 is a schematic diagram of the methodology of the present invention used to measure the contact angle.
Figure 8:
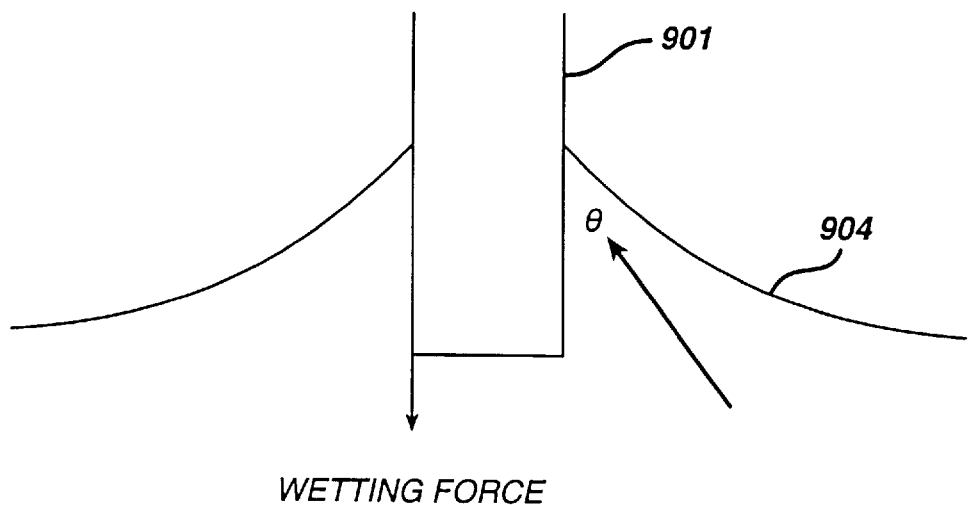
FIG. 8 is a schematic of the various parameters in determining the contact angle.

A schematic diagram of the experimental set-up is given in FIG. 7, while the various perimeters are schematically depicted in FIG. 8.

Figure 9:
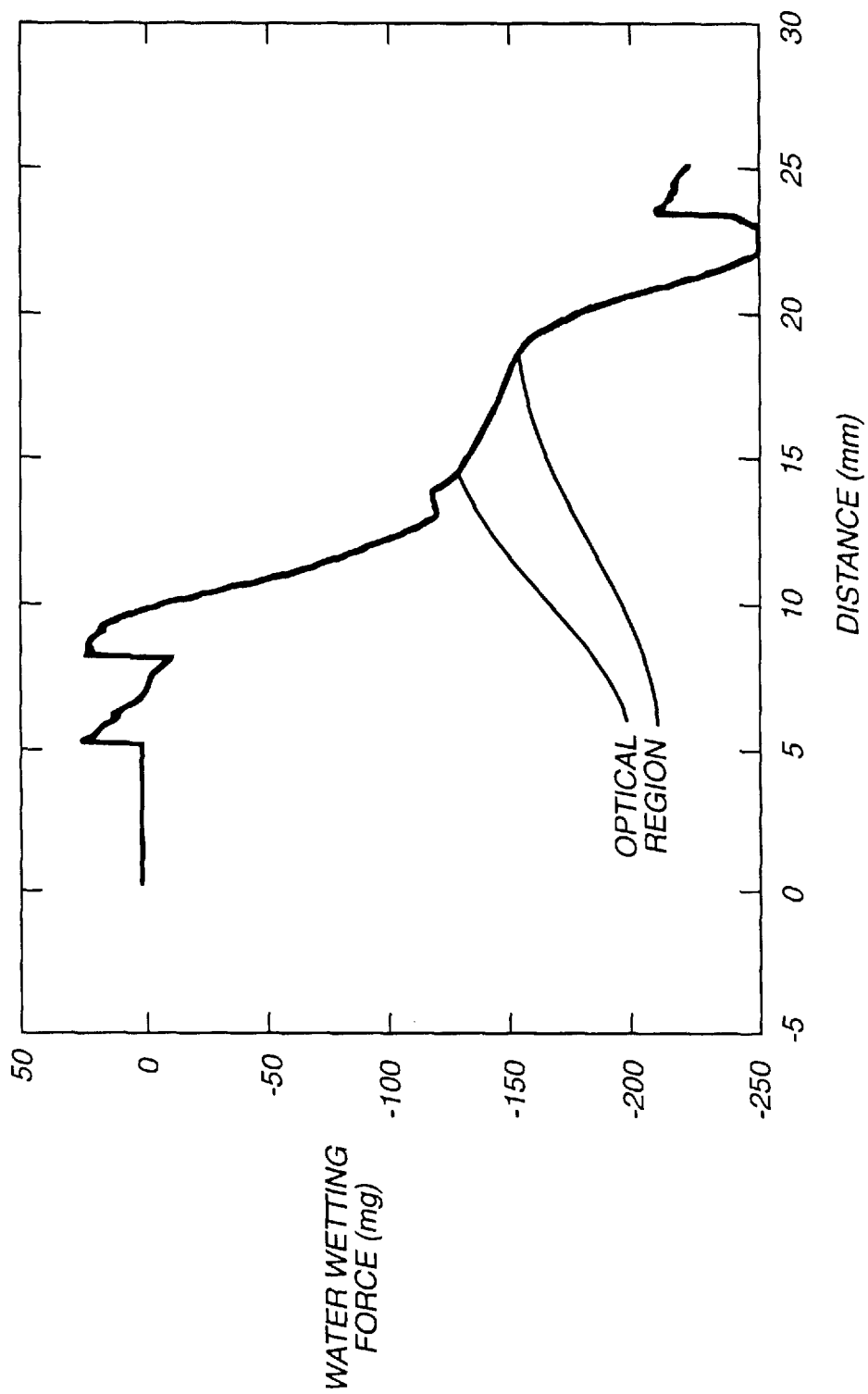
FIG. 9 is a typical water wetting force trace.

A sample (901), such as the backcurve, is suspended vertically on a microbalance (902). The probe liquid (903), such as water, is slowly raised to immerse the backcurve. The wetting force between the probe liquid and the backcurve as the probe liquid is being raised is measured by the microbalance which is recorded on a recorder 905. A trace of the wetting forces as a function of distance travelled by the water meniscus (904) over the backcurve surface is obtained. A typical water (backcurve) wetting force trace is given in FIG. 9. In this way, the value of p can be measured.

The probe liquid that is used to make these tests is a common liquid or solvent which has a known surface tension. The preferred probe liquid is water, which has a surface tension of 72.75 dynes cm at 20° C.

From these measurements, the contact angle is calculated.

The inventors have determined that a backcurve with a water dynamic contact angle less than or equal to 100° produces contact lenses with significantly less holes. It is more preferred that the contact angle be less than or equal to 90°. It is even more preferred that the contact angle be less then or equal to about 75°.

Thus, mixing the appropriate wetting agent with the polystyrene or polypropylene making the mold half thereof and measuring the contact angle in accordance with the above procedure is an easy test to determine the feasibility of using the mold half in the process of making contact lenses having a decreased tendency of forming holes or puddles.

The wetting agents used in the present invention are surface active chemicals, such as lubricants, anti-static agents or surfactants which when mixed with the mold material to form the backcurve, effectively changes the mold surface chemistry and its surface properties.

Preferred wetting agents that are utilized are the wetting agents, normally used in the plastic arts that are not toxic to humans. They include the nonionic surfactants, cationic surfactants and anionic surfactants. Especially preferred are salts of fatty acids containing 16–30 carbon atoms. The preferred salts are stearates.

Stearates are salts of stearic acid. They include ammonium salts and metal salts thereof. "Metal stearates" as used herein are the metal salts of stearic acid. These metals include alkali metals, alkaline earth metals, ammonium salts, Group 13 metals, Group 14 metals and transition metals, such as Group 12. Examples of the metals include zinc, sodium, calcium, lead, barium, cadmium, aluminum, lithium, and the like. Examples include HYTECH RSN 248D, PETRAC CP-11LS, PETRAC CP-115G, PETRAC 22, SYN PRO CALCIUM STEARATE PG, SYN PRO-TYPE 114-36, WITCO F, WITCO EXTRA DENSE G, WITCO FP, COMETALS SODIUM STEARATE, SYNPRO SODIUM STEARATE ST, WITCO HEAT STABLE, INTERSTAB ZN-18-1, PETRAC ZN-4, MATHE CALCIUM STEARATE, MILJAC CALCIUM STEARATE, WITCO CALCIUM STEARATE, MATHE SODIUM STEARATE, WITCO SODIUM STEARATE, WITCO T-1, COAD 20, 21, 23, 26 USP, 27B, 27D, 27F, HYTECH RSN 1S31, MATHE ZINC STEARATE S, MATHE ZINC STEARATE 25S, MILJAC ZINC STEARATE, WITCO ZINC STEARATE, PLASTOLUBE, SYNPRO ACF, SYN-PRO 8 (Synthetic Product Zinc Stearate 8), WITCO 42, WITCO 11, and the like.

Other preferred wetting agents are oxygen containing amines such as ethyoxylated tertiary amines, hydroxyalkyl tertiary amines (i.e., tertiary amine tri substituted with alkyl groups containing 1–20 carbon atoms which at least one of the alkyl groups substituted by hydroxy) and quaternary ammonium compounds, especially quaternary ammonium sulfates. Examples of oxygen containing amines are described in Kirk-Othmer "Encyclopedia of Chemical Technology," Vol. 22, p. 379–381, (1983), the contents of which are incorporated by reference. Preferred hydroxalkyl tertiary amine are of the formula

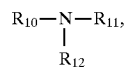

where $R_{11}$ and $R_{12}$ are alkyl of 1–20 carbon atoms containing a hydroxy grdup and $R_{10}$ is an alkyl group of 1–20 carbon atoms. Examples of quaternary ammonium salts are described in Kirk-Othmer, Encyclopedia of Chemical Technology, Vol. 22, pp. 383–384 (1983), the contents of which are incorporated by reference. Examples include ARMOSTAT 410®, manufactured by AKZO, (ethoxylated tertiary amine), ATMER 163®, manufactured by ICI Americas (N,N-BIS-(2-hydroxyethyl)alkylamine), CYASTAT LS, manufactured by CYTEC (3-Lauramidopropyl) trimethylammonium methylsulfate, LAROSTATE 264A, manufactured by PPG (Soy Dimethyl Ethyl ammonium Ethosulfate), and the like.

Other examples of preferred wetting agents are listed hereinbelow:

| Surfactant | Supplier |
| --- | --- |
| Antistat A21750 | Polyccm Huntsman |
| Armostat 310 | Akzo, Ampacat |
| Armostat 41 0 | Akzo |
| Armostat 475 | Akzo |
| Atmer 16 | ICI Americas |
| Chemstat 122 | Chemax |
| Chemsat 122/60DC | Chemax |
| Chemstat 182 | Chemax |
| Eurestat T22 | Schering Berlin |
| Kemamine AS650 | Humko |
| Antistatic KN | 3-V Chemical |
| Atmer 1002 | ICI Americas InL |
| Cyastat 609 | Am. Cyanamid |
| Cyastat LS | Am. Cyanamid |
| Cyastat SN | Am. Cyanamid |
| Cyastat SP | Am. Cyanamid |
| Eurestat 66 | Schering Bedin |
| Larostat 96 | PPG |
| Larostat 451, 477 | PPG |
| Markstat AL-12 | Argus |
| Markstat AL-26, AL-48 | Argus |
| Neutro-Stat A (Conc.) | Simco |
| Addaroma IN | Merix |
| Aristad M & 2M | CDC Infl. |
| Antffog/Antstatic MCG | Morix |
| Antistat AS,50059 | Ferro |
| Antistat AS50098 | Ferro |
| Antistat HTA | Hftech |
| Antistabc Agent 575 | Houghton |
| Angstatic Coating 1412 | Coating Systems |
| Aritistatc Spray | Price-Driscoll |
| Atmer 1 90 | ICI Americas |
| Atmer 8505 | ICI Americas |
| Atmos 150, Atmul 124 | Humko |
| Atmul 84 | Humko |

The additives used in the present invention are materials that are known or commercially available. They are also known release agents. Preferred additives are silicones, amide waxes, fatty acids, polyethylene and propylene waxes, mineral wax, oxidized waxes and the like.

As used herein, the term "silicones" is a term applied to a range of materials based upon a silicon oxygen polymer backbone with a carbon containing side chain of hydrocarbyl groups containing 1–6 carbon atoms. More specifically, it consists of a polymer having a structure consisting of alternate silicon and oxygen atoms of the formula:

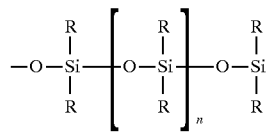

wherein each R may be different, but preferably the same and are a hydrocarbyl group and n is an integer ranging from 20 to about 1500. The molecular weight of the silicone ranges from 2000 to 100,000 g/mole, inclusive. The silicones have very low surface tension, preferably 22–24 mN/m or dyn/cm. In addition, the silicones contemplated for use by the present invention are physiologically inert. They are stable, heat resistant, chemically inert, colorless and odorless. The term silicones includes among other things, silicone oil and silicone wax. Examples include ABILWAX 9800 and 9801, L-42, L-45, NM-1, VISC-10M, SF96, SF1080, SF18-850 DOW CORNING 200, 203, 230, KANTSTIK 406 NOO, KANTSTIK M-55, silicone wax (steroyldimethicone), dimethyl silicone, and the like.

As used herein, amide waxes are waxes having the formula $R_1CONH_2$ wherein $R_1$ is a hydrocarbyl radical and $R_1CONH_2$ has a molecular weight ranging from about 200 to about 2000 g/mole. There may be complete saturation in $R_1$ or there may be at least one carbon-carbon double bond in $R_1$. The amide waxes preferably have up to 40 carbon atoms, although it is preferred that the amide waxes contain from 12–30 carbon atoms. The amide waxes also include higher fatty acid amides, that is, fatty acids having an even number of carbon atoms, ranging from 12–30 carbon atoms. Examples include CRODAMIDE ER, CRODAMIDE OR, CRODAMIDE SR, CRODAMIDE 203, CRODAMIDE 212, EURESLIP 58, KEMAMIDE E, PARICIN 285, PARICIN 220, PETRAC ERMIDE, PETRAC SLIP-EZE, PETRAC VIN-EZE, PETRAC SLIP-QUICK, ACRAWAX C (1,2-ethanediylbiscoctadecanamide), ADWAX 280, EBS WAX, HOSTALUB FA1, PARACIN 285, ROSSWAX 140, CRODAMIDE EBS, BUSPENSE 047, ER, OR, 203, 212 KEMAMIDE B, S, U, ethylene bis (stearamide), oleamide, erucamide, and the like.

Examples of fatty acid are CROD ACID, stearic acid, and the like.

Polyethylene and propylene waxes as used herein are waxes of low, medium or high density of polyethylene or polypropylene, respectively, having a molecular weight ranging from about 5000 to 200,000 g/mole. Examples of polyethylene wax include EPOLENE C-13, C-14, C-15, C-17, C-18, E-10, N-10, N-11, N-21, N-34, HOECHST WAX PE 190, STANWAX, and the like. Examples of propylene wax are EPOLEN N-15P, and EPOLENE E-43P, and the like.

Other waxes such as mineral was, e.g., Montan wax can also be used. Montan wax contains three portions, the wax portion, the resin portion and the asphalt portion. The wax component of Montan wax is a mixture of long-chain ($C_{24}$–$C_{30}$) ester (62–68 wt %), long chain acids (22–26 wt %), and long-chain alcohols, ketones and hydrocarbons (7–15 wt %). The resin portion is approximately 70 wt % terpenes and polyterpenes and 30 wt % resinic acid and oxyresinic acid, while the asphalt portion is believed to be polymerized esters of oxyresinic acid.

Oxidized waxes are alkane hydrocarbons (paraffins) having a molecular weight of 100–2000 g/mole. They are capped at the ends with either ester, carboxylic or hydroxy groups. Examples include carnauba wax and Rosswax, such as Rosswax 100 and 1343 and the like.

As defined herein, glycerol esters are hydrocacrbyl esters of glycerol having a molecular weight of 200 to 2000 g/mole. They include monoglycerides, diglycerides and polyglycerides, including fatty acids of triglycerides. Examples include PATIONIC 900, 901, 902, 907, 919, 1042 and 1042 K, and the like.

Alcohol esters contain 5–2000 carbon atoms, and include such species as LUBE 106, and the like.

Complex esters are copolymers of organic phosphate esters having a molecular weight of 200–2000 g/mole which contain glycerides, organic acid derivatives and fatty acids. Examples include KANTSTIK FX-9 and Q, and the like.

Combination of the additives listed hereinabove or blends include MOLD EASE PCR, MOLD WIZ INT 33 PA, INT 38 H, INT 33 UDK, and the like. It is preferred that the combination have a molecular weight ranging from 200 to 200,000 g/mole.

As defined herein, hydrocarbyl is an aliphatic, cyclaliphatic, or aromatic moiety containing carbon and hydrogen atoms, having 1 to 200 carbon atoms. The hydrocarbyl moiety may be straight chain, or branched or cyclic. If cyclic, the rings are preferably fused. The hydrocarbyl group may be completely saturated or partially saturated or completely aromatic or conjugated. The hydrocarbyl moiety may contain at least one double bond. It is preferred that the hydrocarbyl group contains 1–100 carbon atoms.

The most preferred additives are SF 1080 Silicone Oil, Int 38H Ester Complex, Kantstick Q Ester Complex, FC 430 Ester Complex, ABIL® Wax 9801, Silicone Wax (stearyl dimethicone), SF 96-5 Silicone Oil, L-42, Acrawax® C (1,2 ethanediylbis-octadecanamide), polystyrene 202, FC 4331 Ester Complex, SF 18-350 Silicone Oil, L-45 (dimethyl silicone), ABIL® wax 9801 (cetyl dimethicone), VSC-10M, Carnauba Wax and Ross Wax 100. The more preferred additives are SF 1080 Silicone Oil, Int. 38H Ester Complex, Kantstick Q Ester Complex, FC 430 Ester Complex and Abilwax 9801 Silicone Oil.

Exemplary formulations include polystyrene with the following additives or wetting agents in the indicated amounts.

| ADDITIVE | AMOUNT BY WEIGHT |
| --- | --- |
| ABILWAX 9801 | 0.25% |
| ABILWAX 9801 | 1.00% |
| FC 430 | 0.25% |
| KANTSTICK Q | 0.25% |
| KANTSTICK Q | 1.50% |
| SF 1080 | 0.5% |
| SF 1080 | 0.25% |
| AXEL 33 P/A | 0.25% |
| AXEL 33 P/A | 2.50% |
| AXEL 33-H | 0.25% |
| AXEL 38-H | 2.5% |
| GE 1080 | 0.5% |
| GE 1080 | 0.25% |
| CYASTAT LS | 0.05% |
| CYASTAT LS | 0.50% |
| CYASTAT LS | 1.00% |
| ATMER 163 | 0.50% |

The composition of the present invention is utilized to replace articles of manufacture wherein polystyrene or polypropylene is normally utilized. In one such application, the composition of the present invention is employed to comprise a mold half of separable two part mold assembly utilized in the preparation of soft contact lenses. The mold is comprised of at least two pieces, a female, concave piece and a male convex piece, forming a cavity therebetween, when such pieces are mated, with at least one flange thereabout. At least one of the pieces is comprised of the composition of the present invention. In other words, both mold halves or one mold half is comprised of the composition of the present invention. When only one mold half is comprised of the composition of the present invention, the other mold half is comprised of a thermoplastic polymer that is normally used to make mold halves for contact lenses, as described hereinbelow. It is preferred that the base mold half be comprised of the composition of the present invention.

A preferred mold assembly is depicted in FIGS. 3 and 3a, which illustrate respectively top elevational and side views of one embodiment of a front mold half 10 useful in the production of a contact lens by the polymerization of a polymerizable composition in a mold assembly comprised of two complementary front and base mold halves. As indicated, the mold halves are useful in the production of contact lenses in that lenses can be made which are immediately ready to wear, and in that unswelled lenses can be made which need to be swelled (hydrated) to be ready to wear.

Although as indicated above, the front mold half 10 may be comprised of the present formulation, it is preferred that the front mold half 10 is formed of a suitable thermoplastic polymer which is sufficiently transparent to ultraviolet light to allow irradiation therethrough with light to promote the subsequent polymerization of a soft contact lens. Examples of suitable materials include polyolefins such as low, medium, and high density polyethylene, polypropylene, including copolymers thereof; poly-4-methylpentene; and polystyrene. Other suitable materials are polyacetal resins, polyacrylethers, polyarylether sulfones, nylon 6, nylon 66 and nylon 11. Thermoplastic polyesters and various fluorinated materials such as the fluorinated ethylene propylene copolymers and ethylene fluoroethylene copolymers may also be utilized. Other materials that can be utilized for the front mold half are described in U.S. Pat. No. 4,565,348, the contents of which are incorporated by reference. The most preferred material for the front mold half is polystyrene or polypropylene.

The front mold half 10 defines a central curved section with an optical quality concave surface 15, which has a circular circumferential parting edge 14 extending therearound. The parting edge 14, shown in enlarged detail in FIG. 3(b), is desirable to form a sharp and uniform plastic radius parting line (edge) for the subsequently molded soft contact lens. A generally parallel convex surface 16 is spaced from the concave surface 15, and an annular essentially uniplanar flange 18 is formed extending radially outwardly from the surfaces 15 and 16 in a plane normal (perpendicular) to the axis (of rotation) of the concave surface 15. The concave surface 15 has the dimensions of the front curve (power curve) of a contact lens to be produced by the front mold half, and is sufficiently smooth such that the surface of a contact lens formed by polymerization of a polymerizable composition in contact with the surface is of optically acceptable quality. The front mold half is designed with a thinness (typically 0.8 mm) and rigidity effective to transmit heat therethrough rapidly and to withstand prying forces applied to separate the mold half from the mold assembly during demolding.

FIGS. 4 and 4(a) illustrate respectively top, elevational and side views of one embodiment of a second, or back curve mold half 30. The back curve mold half is designed with all of the same design considerations mentioned hereinabove with respect to the front curve mold half 10.

The back curve mold half 30 is preferably formed of the composition of the present invention. The back curve mold half 30 defines a central curved section with an optical quality convex surface 33, a generally parallel concave surface 34 spaced from the convex surface 33, and an annular essentially uniplanar flange 36 formed extending radially outwardly from the surfaces 33 and 34 in a plane normal to the axis (of rotation) of concave surface 34. The convex surface 33 has the dimensions of the rear curve (which rests upon the cornea of the eye) of a contact lens to be produced by the base mold half, and is sufficiently smooth such that the surface of a contact lens formed by polymerization of a polymerizable composition in contact with the surface is of optically acceptable quality. The base mold half is designed with a thinness (typically 0.6 mm) to transmit heat therethrough rapidly and rigidity effective to withstand prying forces applied to separate the mold half from the mold assembly during demolding.

The mold halves 10, 30 define generally triangular tabs 26, 37 integral with the flange which project from one side of the flange. The tab 37 extends to the injection hot tip which supplies molten thermoplastic to the mold, and also defines therein angled (e.g., 45°) web sections 22, 38 for smoothing the flow of the polymer wave front and thus to avoid jetting, sink marks, weld lines and other undesirable flows which would impair the optical quality of the mold half. The mold halves 10, 30 also define small circular projections 25, 35 which serve as traps in the molding process to immobilize small plugs of colder polymers that may form at the injection hot tip between cycles.

The reactive monomer mixtures (polymerizable composition) which are polymerized in the mold assembly comprised of the two mold halves include copolymers based on 2-hydroxyethylmethacrylate ("HEMA") and one or more comonomers such as 2-hydroxyethyl acrylate, methyl acrylate, methyl methacrylate, vinyl pyrrolidone, N-vinyl acrylamide, hydroxypropyl methacrylate, isobutyl methacrylate, styrene, ethoxyethyl methacrylate, methoxy triethylene/glycol methacrylate, glycidyl methacrylate, diacetone acrylamide, vinyl acetate, acrylamide, hydroxytrimethylene acrylate, methoxyethyl methacrylate, acrylic acid, methacrylic acid, glycerol methacrylate, and dimethylamino ethyl acrylate.

Preferred polymerizable compositions are disclosed in U.S. Pat. No. 4,495,313 to Larsen, U.S. Pat. No. 5,039,459 to Larsen et al. and U.S. Pat. No. 4,680,336 to Larsen et al., which include anhydrous mixtures of a polymerizable hydrophilic hydroxy ester of acrylic acid or methacrylic acid and a polyhydric alcohol, and a water displaceable ester of boric acid and a polyhydroxyl compound having preferably at least 3 hydroxyl groups. Polymerization of such compositions, followed by displacement of the boric acid ester with water, yields a hydrophilic contact lens. The mold assembly of the present invention described herein may be used to make hydrophobic or rigid contact lenses, but the manufacture of hydrophilic lenses is preferred.

The polymerizable compositions preferably contain a small amount of a cross-linking agent, usually from 0.05 to 2% and most frequently from 0.05 to 1.0%, of a diester or triester. Examples of representative cross linking agents include: ethylene glycol diacrylate, ethylene glycol dimethacrylate, 1,2-butylene dimethacrylate, 1,3-butylene dimethacrylate, 1,4-butylene dimethacrylate, propylene glycol diacrylate, propylene glycol dimethacrylate, diethylglycol dimethacrylate, dipropylene glycol dimethacrylate, diethylene glycol diacrylate, dipropylene glycol diacrylate, glycerine trimethacrylate, trimethylol propane triacrylate, trimethylol propane trimethacrylate, and the like. Typical cross-linking agents usually, but not necessarily, have at least two ethylenically unsaturated double bonds.

The polymerizable compositions generally also include a catalyst, usually from about 0.05 to 1% (w/w) of a free radical catalyst. Typical examples of such catalysts include lauroyl peroxide, benzoyl peroxide, isopropyl percarbonate, azobisisobutyronitrile and known redox systems such as the ammonium persulfate-sodium metabisulfite combination and the like. Irradiation by visible light, ultraviolet light, electron beam or a radioactive source may also be employed to catalyze the polymerization reaction, optionally with the addition of a polymerization initiator. Representative initiators include camphorquinone, ethyl-4-(N,N-dimethylamino)benzoate, and 4-(2-hydroxyethoxy)phenyl-2-hydroxyl-2-propyl ketone.

Polymerization of the monomer or monomer mixture in the mold assembly is preferably carried out by exposing the composition to polymerization initiating conditions. The preferred technique is to include in the composition, initiators which work upon exposure to ultraviolet radiation; and exposing the composition to ultraviolet radiation of an intensity and duration effective to initiate polymerization and to allow it to proceed. For this reason, the mold halves are preferably transparent to ultraviolet radiation. After the procure step, the monomer is again exposed to ultraviolet radiation in a cure step in which the polymerization is permitted to proceed to completion. The required duration of the remainder of the reaction can readily be ascertained experimentally for any polymerizable composition.

As indicated at step 108 in FIG. 1, the monomer or monomer mixture is degassed prior to the filling of the front curve mold half in order to remove dissolved gases. $O_2$ is removed because of its deleterious effect on polymerization. Other gases, including $N_2$, are removed to avoid the formation of gas bubbles when the monomer is expelled from the relatively high pressure of the pump line which supplies the fill nozzle, to encounter the atmospheric or subatmospheric $N_2$ pressure of the filling and assembly chambers.

The contact lens are prepared by various techniques known to be skilled artisan, except at least one mold half is comprised of a formulation of the present invention. For example, they may be prepared by the direct molding of hydrogel contact lenses, which is disclosed in U.S. Pat. Nos. 4,495,313 to Larsen, 4,565,348 to Larsen, 4,640,489 to Larsen et al., 4,680,336 to Larsen et al., 4,889,664 to Larsen, et al. and 5,039,459 to Larsen et al., the contents of which are all incorporated herein by reference.

Another method is schematically depicted in FIG. 1. The following discussion is exemplary and is described in more detail in copending and commonly assigned U.S. application Ser. No. 08/258,654, pending, of Wallace Martin, et al. for Consolidated Contact Lens Molding, application Ser. No. 08/258,267, abandoned, of Lust et al. for Apparatus for Removing and Transporting Articles from Molds; application Ser. No. 08/257,786, abandoned, of Wang et al., for Production Line Pallet System; application Ser. No. 08/257,792, abandoned, of Martin et al. for Mold Clamping and Precure of a Polymerizable Hydrogel; application Ser. No. 08/257,785, now U.S. Pat. No. 5,540,410, of Lust et al. for Mold Halves and Molding Assembly for Making Contact Lenses; and application Ser. No. 08/257,802, abandoned, of Martin et al. for On-Line Injection Molding with Nitrogen Blanket, the contents of which are all incorporated by reference. The mold front curves and back curve molds described hereinabove are prepared in accordance with the description therein.

In the description hereinbelow, the procedure is described in which the backcurve mold is comprised of the formulation of the present invention. This is just exemplary as the front curve mold or both the backcurve mold and the front curve mold may be comprised of the instant formulation.

For efficiency, ease of operation and cycle times, the front curve mold and back curve mold are made using injection molding devices. It is preferred that the thermoplastic material for the front lens and the composition of the present invention for the back mold is provided in the form of pellets or particles of relatively high surface area which have equilibrated fully with available oxygen available in the atmosphere.

In this methodology the mold is designed to produce fully formed lens mold parts directly, that is without associated support structure such as a frame; there is in consequence no need to dissociate the part from unneeded polymer material on demolding, and the lens mold parts may be directly collected by automated robotic means for delivery to the transport means. In any given cycle, any number of mold parts may be prepared but for convenience of handling, typically 8 lens mold parts of concave or convex configuration are prepared in a given cycle and transferred by automated robotic means to a pallet of aluminum or stainless steel in which they are received and supported in a regular spatial array adapted for further operations.

It should be understood that at most stages of the continuous process, inspection means are operational to effect rejection of parts against reference criteria; hence, following injection molding, inspection, generally visual, employing photoelectric means, for example, for such defects as haze, mold defect as in configuration due to improper material feed and the like may lead to rejection of a part and thus disposal. To maintain the continuity and consistency in line operations generally a whole mold cycle or pallet of lens mold parts will be expelled from the line following discovery of a defect in any one lens mold part. Each of the pallets contain a unique bar code number for use in pallet tracking and quality control procedures utilizing bar code scanners.

The apparatus for removing and transporting lens mold parts from the mold to the transport means includes hand means for receiving the mold parts and a support subassembly capable of sliding and pivotable movement required for transfer of the mold parts to the horizontally operating transport means.

Figure 2:
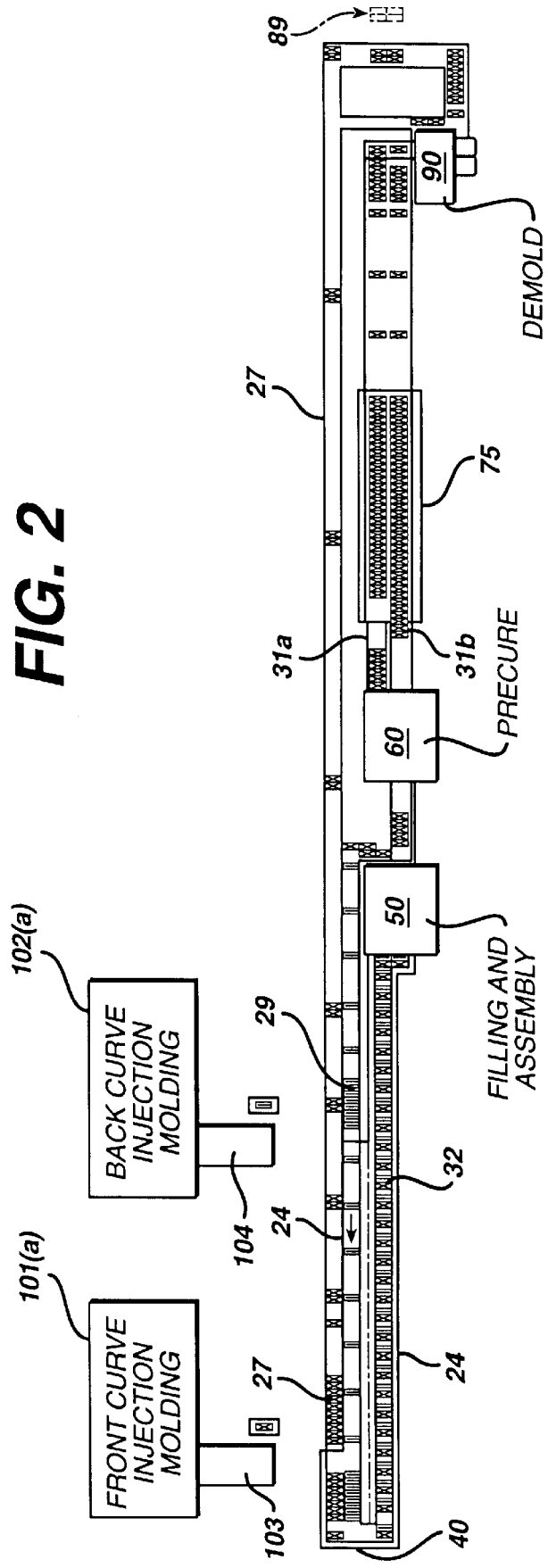
FIG. 2 is a top elevational planar view of the production line system constructed according to the present invention.

As illustrated in FIGS. 1 and 2 injection molds #1 and #2, shown at steps 101 and 102 in the flow diagram of FIG. 1, mold respectively front curve and back curve lens mold parts or sections; they may be located in tandem as shown in FIG. 2 or to shorten exposure to the atmosphere still further, they may be located in a common plane intersecting a bifurcated transport line, even perpendicularly oriented thereto in the same plane.

Robotic means 103, 104 are provided adjacent the mold registry and engagement station for receiving concave and convex lens molds, respectively and transferring said mold part to a low oxygen environment at a high production cycle rate, as noted at step 105.

In the course of or following complete degassing of the lens mold sections as indicated at 106 in FIG. 1, the pallets containing concave and convex lens mold sections are ordered into interleaved relation and degassed when enclosed in feed conveyor such that automated equipment may effect their operative interengagement into molding relation.

The sequencing conveyor 32 including the interleaving station 40 is enclosed and pressurized over its entire length with an inert gas, conveniently nitrogen. The amount of nitrogen is not critical, it being suitable to use just enough nitrogen pressure to effectively exclude the atmosphere under the operating conditions experienced. In the nitrogen tunnel surrounding sequencing conveyor 32 the freshly prepared lens mold blanks are degassed as indicated at step 106 in FIG. 1.

The concave lens molds are filled with the reactive monomer composition at step 107 and the concave and convex lens molds are placed into registry and urged into complementary molding relation. The filling and assembly zone 50 surrounds a portion of the conveying or transport means 32, which delivers to the zone pallets concave and convex lens mold sections, respectively, and at the terminus of the zone carries pallets of paired and filled molds to the procure zone. The filling and assembly zone illustrated in FIG. 2 at 50 is defined by a geometrically appropriate, transparent enclosure, generally of rectangular cross-section, formed of any suitable thermoplastic or metal and thermoplastic construction.

As illustrated at 107 in FIG. 1, the concave lens mold sections are filled with degassed monomer composition from step 108, and then transported to an assembly module optionally having a vacuum chamber formed intermittently within the nitrogen tunnel in which filled concave lens molds are engaged with convex mold sections in vertical alignment and in mating relation, such that the reactive monomer composition is trapped between the optical surfaces of the respective mold sections and at least partially sealed by the engagement of the parting edge formed peripherally in each of the lens mold sections. If present, the vacuum is released. Then, the mated mold is passed through nitrogen to the precure station, an integral part of the nitrogen tunnel.

Following assembly of the mold parts, the incipient lens monomer is precured at step 109 in the precure module 60 of the present invention. The process of the procure involves clamping the mold halves in registration and then precuring the monomer or monomer mixture to a gel like state.

Following precure, the polymerization of the monomer or monomer mixture is completed in curing tunnel 75 as indicated at step 110 with irradiation.

In the cure zone (75), the monomer/diluent mixture is then cured in a UV oven whereby polymerization is completed in the monomer(s). This irradiation with actinic visible or ultraviolet radiation produces a polymer/solvent mixture in the shape of the final desired hydrogel. In addition, the cure zone also has a source of heat which is effective to raise the temperature of the polymerizable composition to a temperature sufficient to assist the propagation of the polymerization and to counteract the tendency of the polymerizable composition to shrink during the period that it is exposed to the ultraviolet radiation.

After the polymerization process is completed, the two halves of the mold are separated during a demolding step leaving the contact lens in the first or front curve mold half 10, from which it is subsequently removed. It should be mentioned that the front and back curve mold halves are used for a single molding and then discarded or disposed of.

Heating the back curve lens mold creates differential expansion of the heated mold polymer relative to the cooler lens polymer which shifts one surface with respect to the other. The resultant shear force breaks the polymerized lens/polymer mold adhesion and assists in the separation of mold portions. The greater the temperature gradient between the surfaces of the mold portions, the greater the shearing force and the easier the mold portions separate. This effect is greatest when there is maximum thermal gradient. As time continues, heat is lost through conduction from the back mold portion into the lens polymer and the front mold portion, and then collectively into the surrounding environment. The heated back mold portion is, therefore, promptly removed so that very little energy is transferred to the polymer lens, avoiding the possibility of thermal decomposition of the lens. The heating may be accomplished by techniques known to one skilled in the art such as by steam, laser and the like. The process of laser demolding is described in U.S. Pat. No. 5,294,379 to Ross et al, the contents of which are incorporated by reference.

If the heating step is hot air or steam, after the heating step, the back curve is pried from the front curve and mold in the mold assembly, as indicated at Step 111. If on the other hand, the heating is by laser or infrared, no prying is used and the back curve separates spontaneously from the front curve.

The demolding assemblies of the mold separation apparatus 90 each physically pry the back curve mold half 30 from the front curve half 10 of each contact lens mold to physically expose each contact lens situated in the lens mold for conveyance to a hydration station for hydration of the lenses. The prying process occurs under carefully controlled conditions, so that the back curve half 30 will be separated from the front curve half 10 without destroying the integrity of the lens formed in the lens mold.

After the mold assemblies have been separated in the demold apparatus 90, each pallet containing the front curve mold halves with an exposed polymerized contact lens therein, is subsequently transported to a hydration station for hydration and demolding from the front curve lens mold, inspection and packaging, as indicated at Step 112.

In the processes described hereinabove, when the base mold does not contain the additive or wetting agent therein, many lenses that were formed were unusable because they contained defects, such as chips or edge tears or holes, i.e., voids in the center of the cast lenses. Without wishing to be bound, these defects are caused by two different mechanisms. The chips are caused during the demolding process and were noticed when the base curve was separated from the front curve using the prying mechanisms described hereinabove. However, when the appropriate additive is present in the back curve, demolding is facilitated and the back curve is more easily removed. As a result, there are greatly reduced instances of lens damage during the demolding step, in which the back curve is separated from the front curve and the lens, which stays in the front curve. Without wishing to be bound, it is believed that the additive in the back curve modifies the adhesion forces between the lens and the base curve. For example, when polystyrene alone is used, it adheres very strongly to the polymeric material of the lens; however, when the additive is added to the polystyrene, the presence of the additive weakens the friction forces between the polystyrene and the lens material, making it easier to separate the back curve from the lens and the front curve mold. Thus, there is less stress on the lens surface during demolding, making it easier to separate. Thus in a prying action between the lens mold halves, as occurs during demolding, the lens will slip more easily from the convex mold half. Consequently, when the back curve is made up of the mold releasing formulation of the present invention, separating the back curve from the front curve and the lens has become facile. Consequently, less stringent conditions are required for demolding than that used heretofore. In fact, in certain embodiments such as with ABIL WAX 9801, demolding occurs without the temperature gradient thus eliminating the necessity of heat in the demolding step. Thus, using the compositions of the present invention to separate the back curve from the mold assembly, lenses can be demolded in good yields right after the demold tunnel at lower temperature, such as about 60° to 70° C., The additives that are added to the mold material that effectuate those changes are the mold release agents the oils, soaps, waxes, and the like, describe herein.

Wetting agents, when added to the lens mold increase the wetting of the mold material. These wetting agents include the anti-static compounds, i.e., the alkoxylated amines and the quaternary ammonium complexes and the stearic salts, described herein.

Without wishing to be bound, it is believed that the original polystyrene or polypropylene mold (i.e., the mold without additional wetting agents) was a low energy heterogeneous surface having a small portion of high energy area. For example, the mold surface when composed of polystyrene has a mold surface free energy of 42 dynes/cm. A heterogeneous polystyrene or polypropylene mold surface with small portions of high energy surface area caused local non-wetting and voids, which in turn led to lens holes. The lens hole problem was a problem of prior wetting between the reactive monomer mix and the mold surface.

When the wetting agent is added to the mold surface, it significantly improved its wettability. The surface became more homogenous and the high energy surface area was significantly increased. As a result, using the mold material wetting formulation of the present invention instead of the typical formulation, lens holes were reduced significantly. For example, using zinc stearate, as the additive in a polystyrene back curve mold, the lens holes were reduced from the typical 10 to 15% to less than 2%.

However, in many cases, even when the thermoplastic material is admixed with either a wetting agent or additive, the resulting contact lenses have not only a minimum of holes or tears, respectively but concomitantly therewith, the contact lenses have improved yeilds. For example, when the contact lenses were prepared utilizing a backcurve comprised of polystyrene and 1% zinc stearate as the wetting agent, as described hereinabove, the resulting contact lenses had signficantly less holes. Lens puddles are also significantly reduced. Concomitant therewith, however, the amount of chips and tears were decreased, with lens yield improving 7 to 9%. Although such result may indicate that zinc stearate may also act as a mold releasing agent, further experiments show that the zinc stearate is not acting in that capacity. In a study measuring demold forces at various temperatures between contact lens and the polystyrene mold, the results show that there was little or no effect when zinc stearate was used. The major effect on lens demold (or lens release) was due to the higher temperature. Observations of lens demold operation during production did not show any de-mold difference between molds with and without zinc stearate addition.

Similarly, a backcurve comprised of Abilwax, was not wettable in accordance with the wetting test as described hereinabove. It produced, as expected based upon the teachings herein, contact lenses having significantly less chips and tears. However, as shown in Example 8, under the conditions therewith, concomitantly, contact lenses where produced having less holes.

Unless indicated to the contrary, the molecular weights are in units of grams per mole. Moreover, unless indicated to the contrary, the percentages are given in weight percentages.

The present invention is more specifically described by the following illustrative examples. However, it is to be understood that these examples are only described to illustrate the invention, but not to limit scope of the present invention.

EXAMPLE 1

Figure 5:
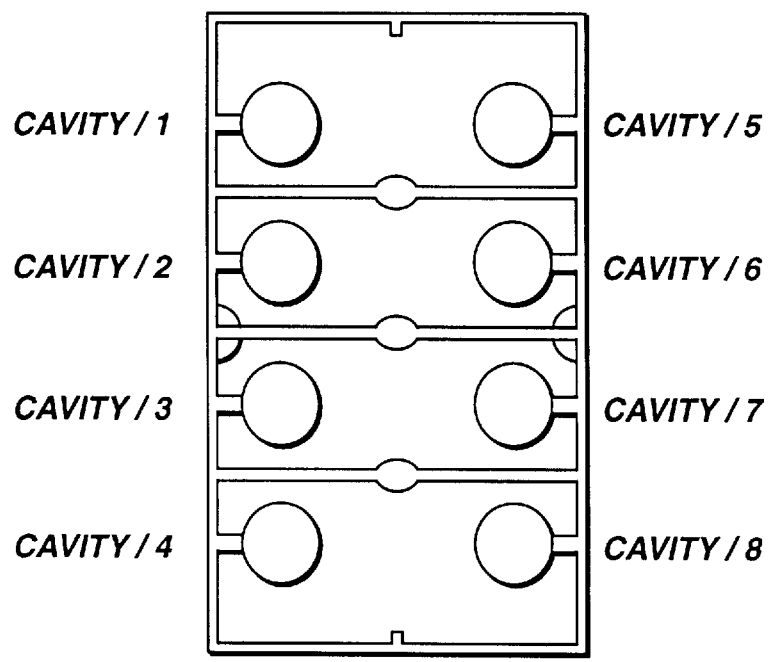
FIG. 5 is a base curve frame of 8 mold halves (cavities) supported and registered in a pallet comprised of various formulations, as described in Example 1.
Figure 6:
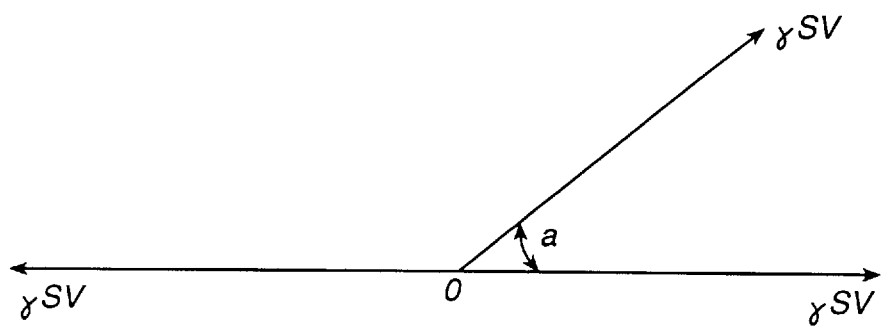
FIG. 6 is a schematic diagram of the contact angle and the surface tension at the solid-vapor and solid-liquid interfaces of a solid immersed in a probe liquid.

Frames were molded on a 60-ton Nestal from the candidate formulations listed hereinbelow in Table 2, in accordance with the procedure described herein. As described herein, and shown in FIG. 5, the pallet contained 8 base mold halves (cavities) arranged as depicted therein. The mold halves were comprised of the various formulations described hereinbelow and contact lens were prepared in accordance with the procedure described herein.

The frame parameters are presented in the following Table.

TABLE 1

|  |  | C-1 | C-3 | C-6 | C-8 |
|---|---|---|---|---|---|
| FRAME ANALYSIS | | | | | |
| HUNTSMAN 202 (Polystyrene) | | | | | |
| FRAME #1 | RADIUS | 8.447 | 8.447 | 8.461 | 8.444 |
|  | P/V | 0.857 | 4.576 | 4.368 | 1.898 |
| FRAME #2 | RADIUS | 8.448 | 3.457 | 8.417 | 8.419 |
|  | P/V | 0.891 | 3.742 | 4.511 | 0.986 |
| FRAME #3 | RADIUS | 8.449 | 8.461 | 8.448 | 8.402 |
|  | P/V | 0.958 | 4.250 | 2.581 | 8.843 |
| HUNTSMAN 202/PVDF (Potystyrene) | | | | | |
| FRAME #1 | RADIUS | 8.872 | 8.881 | 8.879 | 8.875 |
|  | P/V | 0.653 | 0.557 | 0.595 | 0.653 |
| FRAME #2 | RADIUS | 8.879 | 8.888 | 8.887 | 8.877 |
|  | P/V | 0.821 | 0.631 | 0.549 | 0.552 |
| FRAME #3 | RADIUS | 8.859 | 8.816 | 8.879 | 8.872 |
|  | P/V | 0.545 | 2.796 | 1.323 | 2.297 |
| HUNTSMAN 202/0.2225% SF1080 (Silicone Oil) | | | | | |
| FRAME #1 | RADIUS | 7.855 | 7.861 | 7.871 | 7.858 |
|  | P/V | 0.561 | 0.677 | 0.396 | 0.859 |
| FRAME #2 | RADIUS | 7.857 | 7.862 | 7.869 | 7.854 |
|  | P/V | 0.856 | 0.450 | 0.578 | 0.695 |
| FRAME #3 | RADIUS | 7.855 | 7.861 | 7.870 | 7.858 |
|  | P/V | 0.579 | 0.724 | 0.214 | 0.900 |
| FINAL ANALYSIS | | | | | |
| HUNTSMAN 202/0.5% SF1080 (Silicone Oil) | | | | | |
| FRAME #1 | RADIUS | 7.858 | 7.857 | 7.865 | 7.853 |
|  | P/V | 0.526 | 0.557 | 0.442 | 0.560 |
| FRAME #2 | RADIUS | 7.856 | 7.859 | 7.867 | 7.854 |
|  | P/V | 0.621 | 0.428 | 0.335 | 0.449 |
| FRAME #3 | RADIUS | 7.856 | 7.862 | 7.867 | 7.854 |
|  | P/V | 0.539 | 0.552 | 0.388 | 0.554 |

LEGEND:
C-1 cavity ONE of the pallet
C-3 cavity THREE of the pallet
C-6 cavity SIX of the pallet
C-8 cavity EIGHT of the pallet
p/V peak to valley roughness, an interferometric measurement
PVDF polyvinylidene fluoride In table 1, P/V is a roughness measurement, wherein a lower number is a better result. The C-legend refers to the cavity in a frame so that the data as presented eliminates cavity variations.

As can readily be seen from the data in Table 1, in all cases, when the additive, such as SF 1080 was present in the mold, the P/V valve were significantly lower than in its absence. Thus, the data clearly show that the frames using a mold containing the additive produced smoother lenses.

EXAMPLE 2

Frames manufactured from sample candidate formulations plus a control, indicated in the key to Table 2, were prepared on the Acuvue Pilot lens to manufacture lenses in accordance with the procedure described in the present specification. The results are presented in Table 2.

TABLE 2

| | % of Edge Defects | | TOTAL CHIPS |
|---|---|---|---|
| SET # | CHIP | TEAR | AND TEARS |
| I | 44.50 | 1.90 | 46.40 |
| II | 20.40 | 1.10 | 21.50 |
| III | 17.40 | 2.20 | 19.60 |
| IV | 13.80 | 0.00 | 13.80 |
| V | 14.10 | 2.20 | 16.30 |
| VI | 11.50 | 6.30 | 17.80 |
| VII | 22.50 | 15.00 | 37.50 |
| VIII | 32.50 | 5.00 | 37.50 |
| IX | 5.00 | 15.00 | 20.00 |
| X | 10.00 | 10.00 | 20.00 |
| XI | 21.60 | 5.40 | 27.00 |
| XII | 27.50 | 10.00 | 37.50 |
| KEY | | | |
| I | HUNTSMAN 202 ps | | |
| II | 0.5% GE SF1080 | | |
| III | 0.25% GE SF1080 | | |
| IV | 1.0% ABILWAX 9801 | | |
| V | 4.0% ABILWAX 9801 | | |
| VI | 0.25% 3M FC430 | | |
| VII | 2.5% AXEL 33 | | |
| VIII | 0.25% AXEL 33 | | |
| IX | 2.5% AXEL 33 | | |
| X | 0.25% AXEL 38 | | |
| XI | 1.50% KANTSTIK Q | | |
| XII | 0.25% KANTSTIK Q | | |

As can be readily seen by the data in Table 2, the total amount of edge defects (chips and tears) is lower in all cases and significantly lower in many cases when the additives is present.

EXAMPLE 3

In this set of experiments, a study was conducted to evaluate the demolding of different compounds plus a standard polystyrene as base curves.

The lenses (14.0 Acuvue formulation) were processed on the WK Maximize lab line in accordance with the procedure described herein using vacuum deposition and 30 sec UV pre-cure under weight. They had additional four minutes of UV cure without weight at 60° in the simulated tunnel. The frames were kept thermostated in an oven with hot air circulation ±1.5° C. prior to demold, transferred to an aluminum pallet kept at the same temperature and demolded immediately after the WK lab demolder mark 1 which simulates the movement of the mark 1 demolder at present installed in the Maximize pilot line at Vistakon.

No steam was applied.

Movement:
   3.5 deg 0.5 sec fast
   6.0 deg 3.0 sec slow
   15 deg 4.4 sec slow (end fast)

One side was pryed apart. The frames were inspected in a stereomicroscope at 10× immediately after demold. Broken BC flanges, lens lift, missing lenses and tears were recorded. Results from this demold inspection are shown in Table 3.

All lenses, except those with broken flanges, were hydrated in simulated Maximize process: 5 mins at 70° C., 0.05% Tween 80 in D1-water, followed by 3 mins in D1-water + storage overnight in buffered saline.

The lenses were inspected for visual defects in a DL2 using the Vistakon pilot line standards. The conditions are indicated in Table 3.

TABLE 3

| MATERIAL | % CH + TR* | % HO |
|---|---|---|
| Polystyrene | 20 | 3 |
| Polystyrene/GE 1080 0.5% | 20 | 3 |
| Polystyrene/ABILWAX 9801, 1%** | 8 | 2 |
| Polystyrene/ABILWAX 9801, 4% | 10 | 2 |

*Avg. valve of 3 runs
**only 1 run was performed
Key
CH = Chips
HO = Holes
TR = Tears As clearly shown by the data, a preferred embodiment in this run is the mold of polystyrene with ABILWAS, i.e., silicone wax which produced contact lenses having significantly less chips and tears therein than when the lenses were comprised of polystyrene alone.

| TRIAL | ADDITIVE | HOLES | YIELD |
|---|---|---|---|
| 1 | Control | 23% | 67% |
|   | 1% ZnSt added | 2% | 85% |
| 2 | Control | 23% | 58% |
|   | 1% ZnSt | <2% | 84% |
| 3 | Control | 62% | 35% |
|   | 1% ZnSt | 16% | 78% |

As clearly shown, the back curve mold comprised of polystyrene admixed with Zinc stearate showed significant reduction of holes and significant increase in lens yields compared to those of the control.

EXAMPLE 5

Various surface active anti-static agents indicated hereinbelow were admixed with polystyrene to produce backcurve molds. The contact lenses were prepared in accordance with the procedure described herein and the amount of holes measured and compared with the control wherein no additive is used. The results are indicated hereinbelow:

| ANTISTATIC AGENTS | MANUFACTURER | COMPOUND | BACKCURVE MOLD MATERIAL ADDITIVE | HOLES |
|---|---|---|---|---|
| — | — | — | NONE | 13.5–17.2% |
| LAROSTAT 264A ® | PPG | Soy Dimethyl Ehtyl Ammonium Etosulfate | 0.5% LARSTAT 264A | 5% |
| LAROSTAT 264 ® | PPG | Soy Dimethyl Ehtyl Ammonium Etosulfate | 1% LARSTAT 264A ® | 2.6–3.6% |
| CYSTAT LN ® | CYTEC | 3-Lauramido-propyltri-methylul ammonium methylsulfate | 0.5% LYSTAT LN ® | 2.3% |
| CYSTAT LN ® | CYTEC | 3-Lauramido-propyltri-methylul ammonium methylsulfate | 1% CYSTAT LN ® | 16.1–21.6% |
| ARMOSTAT 410 ® | AR20 | Ethoxylated Tertiary Amine | 0.5% ARMOSTAT 410 | 10.7% |
| ARMOSTAT 410 ® | AR20 | Ethoxylated Tertiary Amine | 1% ARMOSTAT 410 | 3.9% |
| ATMER 163 ® | ICI AMERICA | N,N-Bis(2-hydroxyethyl)alkylamine | 0.5% ATMER 163 ® | 1.0–1.3% |
| ATMER 163 ® | ICI AMERICA | N,N-Bis(2-hydroxyethyl)alkylamine | 1% ATMER 163 ® | 0.8%–1.3% |
| ZINC STERATE 8 ® | SYNPRO | ZINC STEARATE | 1% ZINC STEARATE | 0.7–7.5% |
| ZINC STERATE 8 ® | SYNPRO | ZINC STEARATE | 2% ZINC STEARATE | 2.8% |

EXAMPLE 4

1% Zinc stearate (Znst) was mixed with polystyrene to produce backcurve molds. The contact lenses were prepared in accordance with the procedures described herein. The amount of holes and the overall yield were measured and compared with a control wherein no additive was added. Three trials were conducted, and the results are indicated hereinbelow.

EXAMPLE 6

Following the procedures of Examples 4 and 5, the following materials were used to make the backcurves and the lenses were produced in accordance with the description herein. The results are indicated hereinbelow.

Hole Counts of Lenses Made using Various Backcurve Material

| Backcurve Material used to Produce the Lenses | Visual Audits | | Tunnel Audits | |
|---|---|---|---|---|
| | % Holes | 95% CL | % Holes | 95% CL |
| HCC202H1Y[a] (base resin; production) | 9.8 | 2.4 | 15.7 | 4.5 |
| HCC204HON[b] (base resin) | 8.6 | 2.3 | 7.0 | 3.1 |
| 0.25% CYASTAT LS/HCC204HON | 0.7 | 0.5 | 1.7 | 1.6 |
| 0.5% CYASTAT LS/HCC204HON | 0.2 | 0.4 | 0.7 | 1.0 |
| 1% ZnSt8/HCC204HON | 0.3 | 0.5 | 2.0 | 1.7 |
| DOW666D[c] (base resin, production) | 6.2 | 1.3 | 6.5 | 2.1 |
| DOW666APR[d] (base resin, production) | 4.3 | 1.7 | 5.2 | 2.7 |
| 0.05% CYASTAT LS/DOW666APR | 0.5 | 0.6 | 1.7 | 1.6 |
| 0.25% CYASTAT LS/DOW666APR | 0.3 | 0.3 | 1.8 | 1.6 |
| 1% ZnSt8/DOW666APR | 0.6 | 0.1 | | |
| 1% ZnSt8 + 0.05% LAROSTAT 264A/DOW666APR | 0.7 | 0.7 | 0.3 | 0.7 |

[a]Polystyrene base resin manufactured by Hunstman Chemicals Corp.
[b]Polystyrene base resin manufactured by Hunstman Chemicals Corp.
[c]Polystyrene base resin manufactured by Dow Chemicals.
[d]Polystyrene base resin manufactured by Dow Chemicals.

EXAMPLE 7

1% Zinc stearate was mixed with polystyrene to produce backcurve molds. The contact lens were prepared in accordance with the procedures described herein, except the curing temperatures were modified. The % yields are indicated hereinbelow.

| | Yields | | | |
|---|---|---|---|---|
| Curing Tunnel Zone 1 Temperature | 43 (°C.) | 54 (°C.) normal operating condition | 62 (°C.) | 69 (°C.) |
| Production/Control | 31% | 36% | 34% | 30% |
| 1% ZnSt added | 71% | 73% | 68% | 72% |

As shown hereinabove, the lenses made using 1% zinc stearate molds under the above wide temperature range gave about the same high yields. In addition, they gave low holes. Thus, the zinc stearate modified molds allows a wide range of variations in curing conditions and do not affect the lens yields.

EXAMPLE 8

Various soft contact lenses were prepared in accordance with the above procedures utilizing a back mold half made of either polystyrene or polystyrene and additive as described hereinabove. After the mold halves were pried apart, the percentage of holes in the contact lens produced by that mold was determined. The results are tabulated hereinabove.

| Type of Material | % of Holes |
|---|---|
| 1. Polystyrene | 5.4 |
| 2. Polystyrene | 3.8 |
| 3. Polystyrene | 1.8 |
| 4. Polystyrene | 3.2 |
| 5. Polystyrene + 1% Abilwax 9801 | 0.1 |
| 6. Polystyrene + ¼% SF1080 | 0.5 |
| 7. Polystyrene + 3% Axelwax 33 RD | 0.9 |
| 8. Polystyrene + 1% FC430 | 1.2 |
| 9. Polystyrene + 2.0% Axelwax 38H | 0.4 |

As readily shown under these conditions, there were less holes in the contact lens when the back mold contained an internal additive.

The above preferred embodiments and examples are given to illustrate the scope and spirit of the present invention. The embodiments and examples described herein will make apparent to those skilled in the art other embodiments and examples. These other embodiments and examples are within the contemplation of the present invention. Therefore, the present invention should be limited only by the appended claims.

What is claimed is:

1. A mold material constituting a mold half for use in the production of contact lenses, said mold material comprising a thermoplastic polymer and an internal additive which is impregnated into said thermoplastic material by compounding said internal additive and said thermoplastic polymer, said internal additive is present in amounts ranging from about 0.05% to about 5% by weight, said internal additive being a polyethylene or polypropylene wax having a molecular weight ranging from about 5,000 to about 200,000, an amide wax of the formula $R_1CONH_2$, wherein $R_1$ is a hydrocarbyl group, and the amide wax has a molecular weight of about 200–2000, silicone having a molecular weight ranging from about 2000 to about 100,000, Montan wax, oxidized wax, fatty acid having a molecular weight of about 200 to about 2,000, a complex ester or a combination thereof.

2. A mold material constituting a mold half for use in the production of contact lenses, said mold material comprising a thermoplastic polymer and an wetting effective amount of a wetting agent compounded therewith, the wetting force of said mold material being described by the equation:

$$F = 2\gamma_1 p \cos \Theta$$

where F is the wetting force of the mold half
$\gamma_1$ is the surface tension of distilled water
p is the perimeter of the mold material at the meniscus when the mold half is partially immersed in the water and
$\Theta$ is the dynamic contact angle, wherein the contact angle of said mold material is less than 100°.

3. The mold material of claim 1 in which the amide wax is a fatty acid amide wax.

4. The mold material of claim 1 wherein the thermoplastic polymer is polystyrene.

5. The mold material of claim 1 wherein the thermoplastic polymer is polypropylene.

6. The mold material of claim 1 wherein the additive is present in amounts ranging from about 0.1 to about 2.5% by weight.

7. The mold material of claim 1 wherein the additive is silicone.

8. The mold material of claim 2 wherein the wetting agent is an anti-static agent or lubricant.

9. The mold material of claim 2 in which the wetting agent is an ethoxylated amine, hydroxy alkyl tertiary amine or quaternary ammonium sulfate, stearic acid or salt thereof.

10. The mold material of claim 9 wherein the wetting agent is ethoxylated tertiary amine, N,-N-Bis(2-hydroxyethyl) alkylamine, zinc stearate, (3-Lauramidopropyl) trimethyul ammonium methyl sulfate, or soy Dimethyl Ethyl Ammonium Ethosulfate.

11. A mold half useful in the production of a contact lens by the polymerization of a polymerizable composition in a mold assembly comprised of said mold half and a second mold half, said mold half comprising an integral article having a central curved section defining a concave surface, a convex surface and a circumferential edge, at least the central portion of at least one of said concave surface and said convex surface having the dimensions of the back curve of the desired swelled or unswelled contact lens to be produced in said mold assembly and being sufficiently smooth and contoured so that the surface of said contact lens formed by polymerization of said polymerizable composition in contact with said surface is optically acceptable, said article having an annular flange integral width and surrounding said circular circumferential edge and extending therefrom in a plane normal to the axis of said concave surface, said article also having a generally triangular tab situated in a plane normal to said axis and extending from said flange, said article having a thinness and rigidity effective to transmit heat therethrough and to withstand prying forces applied to separate said mold half from said mold assembly, and said mold half being comprised of a mold material comprised of a polystyrene or polypropylene compounded with a wetting agent wherein the wetting force of said mold material is described by the equation:

$$F = 2\gamma_1 p \cos \Theta$$

where F is the wetting force of the mold half $\gamma_1$ is the surface tension of distilled water p is the perimeter of the mold material at the meniscus when the mold half is partially immersed in the water and $\Theta$ is the dynamic contact angle, wherein the contact angle of said mold material is less than 100°.

12. The mold half of claim 11 wherein the contact angle of the mold material is less than or equal to 90°.

13. The mold half of claim 11 wherein the wetting agent is an ethoxylated amine, hydroxy alkyl tertiary amine, or quaternary ammonium sulfate, stearic acid or salt thereof.

14. The mold half of claim 11 wherein the contact angle of the mold material is less than or equal to 75°.

15. The mold half of claim 11 wherein the amount of wetting agent present ranges from 0.05% to 5% (w/w).

16. The mold half of claim 15 wherein the amount of wetting agent present ranges from 0.1% to 2.5% (w/w).

17. The mold half of claim 11 wherein the mold material is ethoxylated tertiaryamine, N,N-Bis(2-hydroxyethyl) alkylamine, zinc stearate, 3-(Lauramidopropyl) trimethylu-lammonium methyl sulfate, or soy dimethyl Ethyl Ammonium Ethosulfate.

18. The mold material of claim 2 in which the wetting agent is present in amounts ranging from about 0.05% to 5% (w/w).

19. The mold material of claim 18 in which the wetting agent is present in amounts ranging from 0.1% to 2.5% (w/w).

20. The mold material of claim 2 in which the dynamic contact angle is less than or equal to about 90°.

21. The mold material of claim 20 in which the dynamic contact angle is less than or equal to about 75°.

22. The mold half of claim 11 wherein said mold half comprising said wetting agent is a back mold half.

* * * * *